United States Patent [19]

Giese

[11] 4,390,145
[45] Jun. 28, 1983

[54] MAGNETIC TAPE HANDLING APPARATUS

[76] Inventor: Wolfgang Giese, Hasselbrookstrasse 39a, 2000 Hamburg 76, Fed. Rep. of Germany

[21] Appl. No.: 236,566

[22] Filed: Feb. 20, 1981

[30] Foreign Application Priority Data

Feb. 20, 1980 [DE] Fed. Rep. of Germany ....... 3006315

[51] Int. Cl.³ .................. B65H 59/38; G03B 1/04; G11B 15/32
[52] U.S. Cl. .................................... 242/186; 226/82; 360/71
[58] Field of Search .................. 242/186, 200–203, 242/206–210; 360/69, 71, 73; 352/170–172, 180–182; 318/6, 7; 226/76–82

[56] References Cited

U.S. PATENT DOCUMENTS 3,600,654  8/1971  Yasutake ............................ 318/6
3,825,675  7/1974  Bradford et al. ............... 226/78 X
4,245,897  1/1981  Beauviala et al. .............. 352/180

FOREIGN PATENT DOCUMENTS 1063836  2/1957  Fed. Rep. of Germany.
2415251  2/1975  Fed. Rep. of Germany.

OTHER PUBLICATIONS

"Electronics" issue of Sep. 27, 1979, pp. 140–144, Microcomputer . . . Performance, Tom Slade, Author.
Telefunken Publication "Magnetic Film Device Magnetophone M5-16", pp. 1 and 2, Jan. 8, 1960.

Primary Examiner—Leonard D. Christian

[57] ABSTRACT

Apparatus for handling a perforated magnetic film (1) in synchronism with other video/audio film equipment comprises winding spools (61, 62), a head-carrier (5), a capstan drive (2) which provides the effective tape drive during normal operation, a sprocket (3) which is rotated by the moving tape, and a computer unit (4) which compares a signal from the sprocket with a signal from other equipment and controls the capstan drive.

15 Claims, 2 Drawing Figures

MAGNETIC TAPE HANDLING APPARATUS

The invention refers to an apparatus for processing perforated magnetic record tape in synchronism with other video and/or audio data. In this field, such perforated tape is conventionally referred to as "magnetic film" or "cord" but the term "tape" is used throughout this text.

The generally known and ordinary separate processing of video and audio data demands separate media or carriers for picture and sound. For the video data, e.g., cinefilm is employed and magnetic tape for audio data.

In the production and reproduction of tapes the simultaneity, i.e., the synchroneity and/or the synchronism of picture and sound must be guaranteed. The mechanism of a magnetic tape apparatus must be able to be coupled synchronously with a cinefilm mechanism, that is, in particular as regards starting, running and stopping of the magnetic tape.

Coupling together of a number of magnetic tape mechanisms may also be desired as likewise coupling to a pilot tone, network frequency, clock generator or a time code (SMPTE-, EBU-code or a time code of another system). For example, the control signals given out for coupling to the magnetic tape apparatus may be obtained as pulse signals from a film camera, a projector, a magnetic picture recording device (MAZ) or other peripheral units. Whilst, e.g., in a film camera or in a projector the cinefilm is moved intermittently, the magnetic tape has to be moved as uniformly as possible past the heads on a head-carrier. Usually the controlling apparatus is called the master machine and the one which is to be controlled is called the slave machine.

A studio magnetic film apparatus is known, having a sprocket drive and a controlled capstan drive (W. Hungerbuhler "Neue Konzeption fur Studio-Magnetfilmgeräte" in an off-print from FKT No. 6/75), in which the sprocket drive brings about the synchronism and the uniform capstan drive, as is known from a normal audio tape machine, brings about the uniform motion of the magnetic tape past the head-carrier.

This involves a pulse motor which conveys a perforated magnetic tape, via the sprocket, rigidly in step with the cinefilm. The uniform capstan drive is controlled by a measuring or regulating device which comprises a socalled servo-balance. In that case the measurement of a deviation in travel or a deflection of the magnetic tape is effected mechanically. In this arrangement the magnetic tape drive during normal operation comprises two drives, namely, the primary sprocket drive and the secondary capstan drive. For a synchronous shunting operation the sprocket drive is employed. In the case of an asynchronous shunting operation (fast reeling) the tape is advanced by a winder drive.

Magnetic drives for non-perforated tape are also known (see, e.g., AEG-Telefunken Magnetophon-Timecode-System MTS 15A), in which, in normal operation, use is made of the simpler capstan drive of the normal audio tape machine, and in which a time code controls the synchronous coupling of magnetic tape apparatus being operated in combination. The time code is recorded on label tracks on the cinefilm and magnetic tapes. In the case of the employment of a master apparatus for perforated tape (see, W. Hungerbuhler) instead of a time code a counting of the perforations may be employed. The systems known for the timecode synchronous coupling are built up with elaborate programming systems which comprise for the control of the synchronous running with the cinefilm, an electronic counter, storage and comparator circuits, time code follow-up controls and follow-up control adaptors. These computer and follow-up controls concern the synchronous coupling between apparatus operated in combination and not, say, a control or regulation internal to the apparatus for the achievement of a tape drive free of slip. In the case of a time code synchronising connection the danger exists of a complete track disappearing. Furthermore a time code can only be read dynamically within certain deviations in speed, and not statically.

The primary sprocket drive described above, having a servo-balance for the control internal to the apparatus of the secondary capstan drive has hitherto been known as the sole slip-free driving system internal to the apparatus, for a magnetic tape. The magnetic tape drive by the sprocket satisfies the requirements of film synchronising technique to a wide extent. But the specific disadvantages of the sprocket drive persist, and it is not possible to guide the tape constantly as simply as in the case of the normal audio tape machine. Furthermore the whole tape drive system is elaborate, since the drive of the tape in normal operation is effected by primary and secondary drives, in a synchronous shunting operation by the primary drive and in an asynchronous shunting operation by winder motors.

Certainly the magnetic tape in the case of this apparatus just as in the case of an audio tape machine may be laid in a straight line but during operation the straightness of the path of the magnetic tape no longer exists because of the servo-balance which is provided. The sprocket drive may be used for magnetic tape of fine thickness by the employment of specially designed clock generators; but fundamentally the incremental sprocket or sprocket wheel drive cannot be effected completely uniformly. In particular the perforations of thin film tapes become mechanically stressed and their working life is restricted. The risk of the tape jumping a tooth of the sprocket also cannot be excluded, in particular during a synchronous shunting operation.

The primary drive by the pulse-controlled sprocket, in a synchronous shunting operation, restricts the tape speed to about ten times the rated or normal speed. During this operation the mechanical loading on the perforations of the magnetic tape is particularly high. Upon changing over to an asynchronous shunting operation, i.e., for fast reeling, an alteration is effected for the guidance of the tape, since the film must be separated from the sprocket drive and a winding mechanism takes over the drive.

The described sprocket roller driving system has the peculiarity that upon changeover of operation between normal operation and a shunting operation an alteration of the travel or path of the tape is effected, since the servo-balance and the control for the capstan drive work only in normal operation, but in a shunting operation are separated from the film. Upon a change in operation a deflection or a slip thereby occurs in the magnetic tape. Since the tape is consequently not guided always in the same way or even in a straight line, the change in operation requires a so-called run-up time which is determined by the time until the lowest flutter is reached in the region of the head-carrier.

As mentioned, a servo-balance has been known to control a uniform secondary capstan drive. On the other hand in the case of magnetic tape apparatus of another construction no control of that kind is known; the uniformity of a magnetic tape drive by conveyor rolls or sprockets is then regulated or controlled merely by elaborate stabilizing systems having close mechanical tolerances. These systems comprise damping mechanisms, a number of guide rolls and pressure rolls. The magnetic film can in no case be guided essentially in a straight line.

The object of the invention is to provide a magnetic tape apparatus for the simultaneity-coupling of video and/or audio data, which whilst avoiding the disadvantages of the sprocket wheel drive known hitherto, provides a mechanically simple slip-free magnetic tape drive.

In accordance with the invention, such an apparatus comprises a tape-winding mechanism, a friction drive which provides the operative tape drive during normal operation, a sprocket which engages the perforations in the tape and is rotated by advance of the tape, and a computer unit which is responsive to rotation of the sprocket and which controls the friction drive.

The magnetic tape drive in the apparatus according to the invention thus enables perforated magnetic tape to be provided with a simple and essentially straight line guidance which has been proven in the case of conventional independent audio tape machines. The laying in of the tape may be effected simply, rapidly and without any problem. A simple capstan or other friction drive conveys the magnetic tape essentially free of slip and automatically, without a secondary drive being necessary. The incremental sprocket drive known hitherto is completely avoided. A control device, in the form of the computer unit, internal to the apparatus controls the slip-free drive, receiving signals from the sprocket sensor. One or more control or emitter signals from synchronous emitters from associated apparatus or from a master apparatus may be compared simply with the sprocket sensor signals by the computer unit.

The perforations in the magnetic tape only carry the sprocket along with them, so that the perforations are not significantly mechanically stressed and it becomes possible to work with particularly thin tape material the working life of which is increased as compared with the tape material driven by sprockets. The thin supple carrier material of the tape guarantees at the head-carrier a particularly good "head contact" and hence higher quality of the sound.

Through the quiet driving of the sprocket as a follower, the jerky non-uniformities of the drive, which in the case of sprocket drive cannot completely be suppressed, are not present and consequently do not have to be levelled out. Also tooth jumping of the magnetic tape over the sprocket is most unlikely to occur.

The follower sprocket which is in operative connection with a sensor has the advantage that an absolutely slip-free travel-dependent measurement of the position of the magnetic tape is effected dynamically and/or statically in a guide path which does not alter by, say a deflection, and that the measurement signals may be further processed statically. In this way a reliable error-free measurement is performed and a propagation of error does not arise. The computer unit can therefore, under optimum conditions, from the comparison of measurement signals with synchronous signals from associated apparatus, send a control signal to the friction drive. The drive of the magnetic tape is thereby controlled free of slip in simultaneity with an external synchronous signal. The time until reaching the lowest flutter, that is, the so-called run-up time, is preponderantly determined by an emitter apparatus. Additional losses of time prior to operation at simultaneity through, say, a servo-balance which is dependent upon deflection, are largely excluded.

A magnetic tape drive is thus provided which is slip-free and capable of moving the tape over an exactly defined distance forwards and backwards, at extremely low speeds or even over a distance of only a few millimeters. The magnetic tape may be guided constantly in an essentially straight line and stretched taut without alteration of its path. The magnetic tape mechanism needs no mechanical stabilizing systems which are elaborate, since they demand additional oscillating mass, damping and roller devices. The static position of the magnetic tape may be stored in the computer unit, which in normal operation can control the friction drive and in a synchronous shunting operation the winding mechanism, and can exhibit further functions. The computer unit may be of relatively small and compact construction and is integrated into the apparatus. It provides in itself the whole of the storage, control and regulating functions without elaborate and complicated additional apparatus or circuits being necessary.

In a synchronous shunting operation the computer unit may be operatively connected to the winding mechanism so that the winding mechanism forms the operative driving means for the magnetic tape. The change of operation from normal operation to a synchronous shunting operation is thus possible without any alteration of the path of the magnetic tape. In this state of operation the sprocket works as before as a measuring roller driven by the tape, so that the above explained advantages of the measurements are preserved. The winding mechanism of the apparatus takes over alone the driving of the tape. The friction drive during this state of operation is ineffective, i.e., the friction spindle or the capstan and a pressure roller associated with it are automatically separated from the tape. Upon the change in the operation the time until reaching the lowest flutter is determined primarily by an associated video apparatus or emitter apparatus. The maximum synchronous shunting speed is established exclusively by the capability of the winding motors of the winding mechanism. The risk of jumping a tooth of the sprocket by the tape is in principle excluded, since the sprocket is only carried along with the tape and provides no driving function. Since the sprocket exerts virtually no mechanical forces upon the perforations of the magnetic tape, the tape is not subjected to stress in rapid running in synchronous shunting operations as in normal running.

In the synchronous shunting operation, the winding mechanism may be designed in such a way that various synchronous shunting speeds are available of which at least the highest is at least 30 times normal speed. As already explained it is exclusively the capability of the winding motors of the winding mechanism which limits the synchronous shunting speed of the film. It is possible to design the aforesaid winding motors in such a way that in this state of operation different speeds and furthermore at least 30 times normal speed may be set. Mechanical stressing of the film by high speed does not occur even in this case. In particular the high synchronous shunting speeds achievable make it possible for the apparatus to be able to be used for synchronous shunting by high-speed cinefilm mechanisms, that is, mainly with video tape apparatus.

For an asynchronous shunting operation, i.e., for fast reeling, the winding mechanism may be the driving means for the magnetic tape and any deviation from synchronism may be stored in storage means in the computer unit. In this operational state in which running may be at higher speeds than in the case of a synchronous shunting operation, the winding motors thus convey the tape. But the computer unit can no longer control the winding mechanism synchronously. The deviation from synchronism arising in the asynchronous shunting operation may be stored and is called upon for the achievement of a subsequent synchronous operation correct in position and time. The aforesaid storage of the deviation from synchronism is guaranteed by the fact that the measuring sprocket is driven along with the film even during the asynchronous shunting. Because of the stored deviation from synchronism high asynchronous shunting speeds are possible. Upon the change of operation into the asynchronous shunting operation the path of the magnetic tape does not alter. As in all of the other cases of operation it may moreover be guided essentially in a straight line and taut.

For the purpose of the measurement of the tape position or travel as explained, the sprocket may be connected to an optoelectric sensor.

The apparatus may comprise mechanical and/or electronic means for accommodating at least three tape formats, for normal operation at different tape speeds and/or for cooperation with differently positioned coating on the tape. A change of the speed from, e.g., 24 pictures/s. to 25 pictures/s. may be effected by electronic means. In the case of a change of format (e.g. 16 mm, 17.5 mm or 35 mm format) or in the case of an adaptation to different track positions only a few components such, e.g., as head carrier and rotating shafts need to be exchanged or converted. This simple handling is guaranteed since, because of the drive, the tape is guided as in the case of a known audio tape machine.

The apparatus may comprise means for concurrence coupling, which is correct with respect to travel and time, with a plurality of magnetic tape mechanisms and/or with a plurality of different control or emitter signals or devices, such as a pilot tone, network frequency, time code or clock generator. Any desired synchronous combined and/or programmed operation with other devices is thereby possible. Additional devices such as outside computers, storage, controls, time code follow-up controls, and follow-up adaptors are not necessary.

The apparatus may advantageously be designed in such a way that the friction drive is arranged between a head-carrier and the sprocket, and the friction drive and the sprocket are arranged after the head-carrier in the direction of forward travel of the tape. The sprocket and the tape drive may then be arranged closely one behind the other, whereby the risk of disturbances may decisively be reduced. Preferably, the tape follows a substantially straight path past the head carrier and friction drive to the sprocket.

The sprocket may also act as a guide roller for the tape. In this way the tape may be guided particularly simply.

In order not to have to perform any regulation of the winding motors, in synchronous or asynchronous shunting operations, as well as in normal operation, the friction drive may be the operative driving means for the magnetic tape so that the winding mechanism may serve exclusively for taking up the magnetic tape slack. In this case the winding motors only need to provide a constant winding tension.

An example of an apparatus constructed in accordance with the invention will now be explained in greater detail with the aid of the accompanying diagrammatic drawings, in which.

Figure 1:
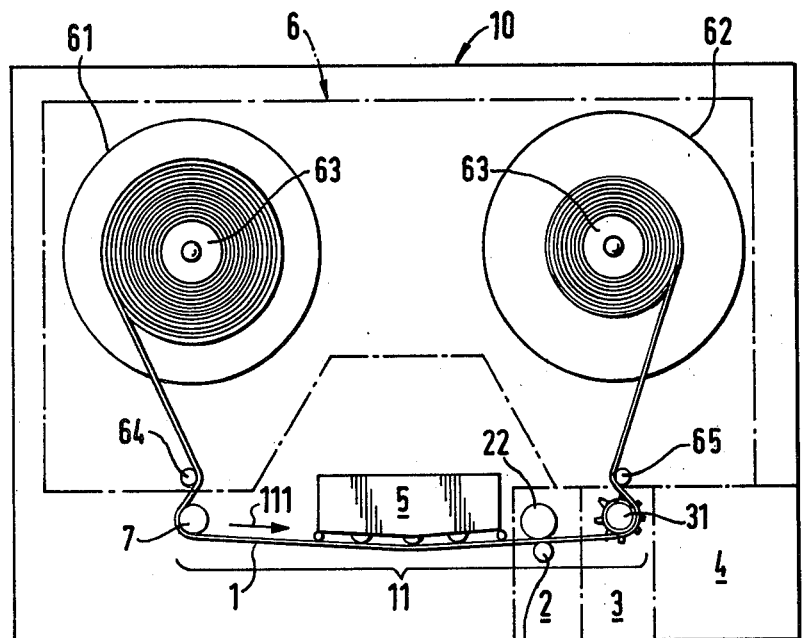
FIG. 1 is a plan.

As shown in FIG. 1 a magnetic tape apparatus 10 comprises a winding mechanism 6 having two winding spools 61 and 62 each with a winding core 63, two winding tension dampers 64 and 65, a capstan drive 2 with a capstan 21 and a pressure roller 22, a measuring device 3 with a measuring sprocket 31, a control device 4, a head-carrier 5 and a guide roller 7.

A magnetic tape 1 is carried in the direction of forward travel 111, from the winding spool 61 past the winding tension damper 64 around the guide roller 7 and then runs along an essentially straight path 11. In the region of the path 11 the head-carrier 5 is arranged first, and then follows the capstan 21, the tape being carried through between the latter and the pressure roller 22. At the end of the path 11 the measuring sprocket 3 is provided. Here the tape is guided by the sprocket 31. It then passes the winding tension damper 65 and runs on to the winding spool 62. The control device 4 is accommodated in the magnetic tape apparatus 10.

The sprocket 31 acts also as a guide roller. During any kind of operation of the apparatus the measuring sprocket 31 and corresponding functions of the control device 4 are affected. The perforated magnetic tape 1 drives the measuring sprocket 31 without significant mechanical forces being exerted on the tape 1. The magnetic tape 1, within its essentially straight path 11, clings to the heads of the head-carrier 5, which are not shown in more detail. The capstan drive 2 and the measuring sprocket 3 are arranged closely one behind the other. In this way both the sensing of the tape 1, and the resulting regulated drive of the tape via the capstan drive 2, are effected on a short stretch of tape running in a straight line, so that, in normal operation, the dynamic and/or static state of the tape are sensed close to the drive. Long or geometrically elaborate tape paths upon which disturbances can act, do not occur between the measuring sprocket 31 and the point of action of the control i.e., the capstan drive 2. In forwards operation of the tape 1 the head-carrier 5, as seen in the direction of forwards travel 111, lies constantly in front of the region of the regulated or controlled drive.

Figure 2:
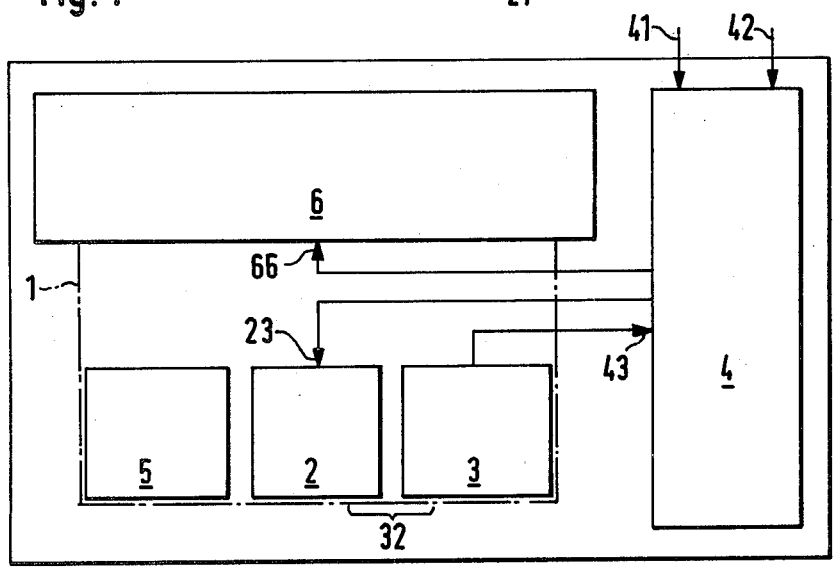
FIG. 2 is a block diagram illustrating the principle of operation.

The basic operative arrangement for a slip-free friction drive by the capstan drive 2 will be appreciated from FIG. 2. At one input to the control device 4 there is a control or emitter signal 41 serving for synchronous coupling. In normal operation a signal 23 from the device 4 controls the friction drive 2. This retroacts via a length of magnetic tape 32 which advantageously is very short, upon the measuring sprocket 3. This in turn provides a signal 43 to the device 4. Here from the signals 43 and 41 a corresponding signal 23 is gained to complete a feed back loop. The friction drive 2 is in normal operation the sole drive for the tape, and, because of the signal 41, is controlled as regards synchronism and synchroneity.

In a synchronous shunting operation a drive of the winding mechanism 6 is controlled because of a signal 41 to simultaneity. The winding mechanism 6 obtains from the device 4 a signal 66 and retroacts via the magnetic tape 1 upon the measuring sprocket 3. This passes a signal 43 to the device 4 which evaluates the signals 41 and 43 and again emits a signal 66 to the drive of the winding mechanism 6.

In an asynchronous shunting operation the device 4 receives a signal 43. By means of the signals 41 and 43 a signal is produced in the device 4 for a synchronous deviation, which in the other above-mentioned kinds of operation may be called upon for the production of the simultaneity. Even a shift in travel of the tape at nominal standstill of the magnetic film apparatus is measured, evaluated and allowed for. A signal 42 at an output of the device 4 may be used for synchronous combined control of further devices.

Instead of the procedure reproduced in the two last paragraphs for the synchronous and asynchronous shunting operation it is, however, also possible to use for the drive exclusively the friction drive 2, so that in this case no special signal from the control or regulating device 4 needs to be passed to the winding mechanism 6, but the latter merely exercises its tensioning function for the winding, whilst the friction drive drives the tape 1.

The advantages which can be achieved by the apparatus include a slip-free drive of the perforated magnetic tape by a friction drive which in normal operation is provided as the only drive, or in synchronous operation by an automatic winding drive, which respectively can be controlled simply and reliably as regards simultaneity of picture and/or sound, and moreover in the constantly essentially straight and unaltered taut guidance of the magnetic film as in the case of the known audio tape machines. The effectiveness and the peculiarity of the control and regulation internal to the apparatus is based upon the fact that the sprocket is part of a measuring station by which the static position and/or the dynamic state of the magnetic tape, even in asynchronous operation, can be sensed most accurately free of error and without mechanical stressing of the tape or its perforations. Also the means of sensing the tape and the means of controlling the driving of the film may be arranged closely spaced one behind the other along the path of the magnetic film. Furthermore, the control device may be of a fundamentally simple construction and is integrated into the tape apparatus.

I claim:

1. An apparatus for processing perforated magnetic record tape correctly along a path in respect of time and its position, and synchronism with other video and/or audio data, said apparatus comprising:

tape-winding means;

friction drive means comprising a driven surface and means to press the tape against said surface providing the sole operative tape drive during normal operation;

measuring sprocket means associated with the path of the tape for engaging the perforations in the tape and for being rotated solely by advance of the tape for detecting the position of the tape and providing a position signal;

means providing an input tape control signal;

computer means responsive to said sprocket means position signal and said input control signal, for comparing said position signal and input control signal to provide a resulting drive control signal for controlling said friction drive means;

magnetic responsive head means adjacent the path of said tape for operatively exchanging information with said tape; and said tape-winding means and friction driving means only moving said tape tautly stretched only along said path engaging said sprocket means without significant mechanical stressing of said tape by said sprocket means during normal operation involving said head means forwardly at low speed, and backwardly and forwardly at high speed so that the position and speed of said tape are always measured by said sprocket means.

2. An apparatus according to claim 1, wherein, in a synchronous shunting operation, said winding means form the operative driving means for the magnetic tape.

3. An apparatus according to claim 2, wherein, in the synchronous shunting operation, various synchronous shunting speeds are available of which at least the highest is at least 30 times the normal speed of operation.

4. An apparatus according to claim 1, wherein, for an asynchronous shunting operation, said winding means are the driving means for the magnetic tape, and any deviation from synchronism is stored in said computer means.

5. An apparatus according to claim 1, wherein, in a shunting operation, said friction drive means are the operative driving means for the magnetic tape and said winding means serve exclusively for taking up the magnetic tape.

6. An apparatus according to claim 1, wherein said sprocket means are coupled to optoelectronic sensing means.

7. An apparatus according to claim 1, further comprising means for accommodating at least three different tape formats, for operation at different tape speeds.

8. An apparatus according to claim 1, further comprising means for concurrence coupling with a plurality of different control signals.

9. An apparatus according to claim 1, wherein said friction drive means are arranged between said head means and said sprocket means, and said friction drive means and said sprocket means are arranged after said head means in the direction of forward travel of the tape.

10. An apparatus according to claim 9, characterized in that said tape follows a substantially straight path past said head means and said friction drive means to said sprocket means.

11. An apparatus according to claim 1, wherein said sprocket means also act as guide means for the tape.

12. An apparatus according to claim 1, wherein said head means, friction drive means and sprocket means are immediately adjacent each other along a substantially straight portion of said tape path.

13. An apparatus according to claim 1, wherein said computer means stores the static position of said tape as determined by said sprocket means.

14. An apparatus according to claim 1, further comprising means for cooperation with differently positioned coating on the tape.

15. An apparatus according to claim 1, further comprising means for concurrence coupling with a plurality of magnetic tape mechanisms.

* * * * *